United States Patent [19]
Carlucci

[11] 3,963,079
[45] June 15, 1976

[54] CULTIVATOR
[76] Inventor: James J. Carlucci, 716 Monroe Ave., Los Banos, Calif. 93635
[22] Filed: Nov. 11, 1974
[21] Appl. No.: 519,331

Related U.S. Application Data
[63] Continuation-in-part of Ser. No. 369,912, June 14, 1973, abandoned.

[52] U.S. Cl. .............................. 172/200; 172/145; 172/175; 172/188; 172/392; 172/646; 172/690; 172/706
[51] Int. Cl.² .................. A01B 13/00; A01B 35/18; A01B 35/24; A01B 65/06
[58] Field of Search .......... 172/188, 133, 387–394, 172/140, 142, 192, 708, 705, 764, 690, 200, 697, 767, 794, 145, 175, 188, 646, 706; 280/26, 27, 28, 21 A

[56] References Cited
UNITED STATES PATENTS

| 166,044 | 7/1875 | Weaver | 172/685 X |
| 326,917 | 9/1885 | Priest | 37/30 |
| 932,785 | 8/1909 | King | 172/392 |
| 952,663 | 3/1910 | Zindorf | 172/460 X |
| 1,245,107 | 10/1917 | Hughes | 172/785 |
| 1,477,846 | 12/1923 | Okamoto | 172/690 |
| 1,969,204 | 8/1934 | Carlson | 172/785 |
| 2,741,487 | 4/1956 | Carefoot | 280/28 |
| 2,985,248 | 5/1961 | Richardson | 172/570 X |
| 3,450,212 | 6/1969 | Sylvester | 172/690 X |
| 3,783,959 | 1/1974 | Krume | 280/21 A |
| 3,866,933 | 2/1975 | Mollring | 280/28 |

FOREIGN PATENTS OR APPLICATIONS

| 75,861 | 12/1918 | Austria | 172/705 |
| 12,463 | 10/1902 | Austria | 172/340 |
| 40,503 | 7/1932 | France | 172/387 |
| 1,122,656 | 9/1956 | France | 172/387 |
| 1,309,994 | 12/1962 | France | 172/387 |
| 440,522 | 2/1927 | Germany | 172/397 |
| 717,699 | 10/1966 | Italy | 280/21 A |
| 602,809 | 6/1948 | United Kingdom | 172/705 |
| 507,570 | 6/1939 | United Kingdom | 172/133 |

Primary Examiner—J. Reed Fisher
Assistant Examiner—Steven A. Bratlie
Attorney, Agent, or Firm—Huebner & Worrel

[57] ABSTRACT

A cultivator for conditioning the earth surface along row crops, the cultivator having a frame adapted for earth traversing movement along rows of such crops; scraper blade assemblies mounted on the frame for floating action; and earth surface engaging, blade depth control skis affixed on the assemblies and forwardly extended therefrom elevationally controlling the scraper blade assemblies in response to the earth traversed thereby.

4 Claims, 13 Drawing Figures

CULTIVATOR

This application is a continuation-in-part of my U.S. Pat. application Ser. No. 369,912 filed June 14, 1973 entitled "Cultivator" now abandoned.

BACKGROUND OF THE INVENTION

The present invention relates to a cultivator and more particularly to a cultivator which is adapted for use in conditioning the earth surface along row crops, such as cotton, permitting precise control of the earth environment for the crops.

The raising of certain row crops, such as cotton, on a commercial scale presents particularly acute problems of soil control. After the seed has been planted but before the seedlings have penetrated the earth surface, soil conditions frequently inhibit or preclude the emergence of the seedlings. A rain following planting usually produces a surface crust through which the seedlings are unable to emerge. When this occurs, the farmer usually tries to break up the crust by comminuting the soil along the rows by rolling toothed wheels thereover. Although for many years this has been recognized as the best available procedure, it as been notoriously ineffective. The toothed wheels damage the sprouting seeds and thus in many instances destroy that which they are intended to save. They damage or destroy the plants which have emerged. In any event, the resultant stand is seriously impaired and many gaps occur in the rows. There being no way for a cultivator, spray equipment, or irrigation water to distinguish between portions of the rows having proper plant spacing and those having no plants, the gaps must be farmed the entire season just as tediously, laboriously and expensively as portions of the rows having proper plant spacing. For these reasons, many cotton farmers recultivate and completely replant whenever their fields become crusted prior to plant emergence. While this procedure has been the only one capable of insuring a proper stand, it is expensive and results in a shortened growing season with proportionately restricted crop production and quality.

The present invention results from the discovery that the objectionable features of both procedures can almost always be avoided by the provision of a cultivator capable of precise control which can shave off the crust whenever it occurs without such variations in depth control as to impair the sprouting seeds. A virtually totally effective procedure is found to be the planting of the seeds at a slightly greater depth than normal so as to accommodate an accurately controlled removal of a thin surface layer of the soil, whether crusted or not, after the seeds have germinated but before the sprouts have reached to within a quarter of an inch or so of the surface. Thus the seedlings can emerge through loose soil and a good stand can be attained in spite of late rains.

Crusting soil also acts as a barrier to the most effective utilization of soil additives. Fertilizers, herbicides, fungicides, and the like applied to the earth surface are impeded from most effectively permeating the soil by the presence of such a crust particularly where the earth slopes away from the rows on the opposite sides thereof, as is the normal condition in row crop farming.

Conventional cultivating implements are not suitable for working the soil where such conditions exist, particularly immediately adjacent to the plants. The unwieldy construction of such implements as well as their propensity to work the soil at depth rather than just at the level of the surface crust severely limits their utility under such conditions. In this connection attention is invited to the following U.S. Patents which were either cited against the parent application or called to the attention of the Patent Office by the applicant:

| Patent No. | Applicant | Issue Date |
|---|---|---|
| 166,044 | Weaver | 7-27-1875 |
| 326,917 | Priest | 9-22-1885 |
| 952,663 | Zindorf | 3-22-1910 |
| 1,067,589 | Dawson | 7-15-1913 |
| 1,245,107 | Hughes | 10-30-1917 |
| 1,477,846 | Okamoto | 12-18-1923 |
| 1,540,100 | Carter | 6-02-1925 |
| 1,549,031 | Spurling | 8-11-1925 |
| 1,969,204 | Carlson | 8-07-1934 |
| 2,309,847 | Holton | 2-02-1943 |
| 2,660,817 | Thomas | 12-01-1953 |
| 2,739,517 | Roberts | 3-27-1956 |
| 2,985,248 | Richardson | 5-23-1961 |
| 3,306,240 | Ritchie | 2-28-1967 |
| 3,474,869 | Mowbray et al | 10-28-1969 |
| 3,552,498 | Stauber | 1-05-1971 |
| 3,684,029 | Clover | 8-15-1972 |
| 12,463 | Austrian | 7-10-1903 |
| 25,742 | Swedish | 6-07-1907 |

Therefore, it has long been recognized that it would be desirable to have a cultivator adapted to be precisely controlled to limit the depth and character of soil cultivation thus minimizing the disturbance of seeds or growing row crops while most advantageously conditioning the soil.

SUMMARY OF THE INVENTION

In view of the foregoing, it is an object of the present invention to provide an improved cultivator.

Another object is to avoid soil crusting and consequent interference with seedling emergence in row crop farming operations.

Another object is to provide a cultivator which is adapted to be employed to condition the soil to permit precise control of the earth environment for crops, and particularly newly planted seeds.

Another object is to provide such a cultivator which can be adjusted precisely to limit the depth of soil penetration.

Another object is to provide such a cultivator which permits limited cultivation of the surface layer of a seed bed or immediately adjacent to a row crop with a minimum of disturbance to the seeds or row crop.

Another object is to provide such a cultivator which cultivates the soil by preparing substantially level swaths on the immediate opposite sides of the row crop followed by slicing the soil within the swaths.

Another object is to provide such a cultivator which is adapted to be employed to place the soil in the most receptive condition for the application of soil additives such as fertilizers herbicides, fungicides and the like.

A further object is to provide such a cultivator which has scraper blades mounted to accommodate variations in ground level and to pass over obstructions encountered on the ground surface.

Still further objects and advantages are to provide improved elements and arrangements thereof in a device for the purposes described which is dependable, economical, durable and fully effective in accomplishing its intended purposes.

DESCRIPTION OF THE FIRST EMBODIMENT OF THE PRESENT INVENTION

Referring more particularly to the drawings, the cultivator of the first form of the present invention is generally indicated by the numeral 10. The cultivator is adapted to be borne for earth traversing movement by a tractor or the like, fragmentarily represented at 11. The tractor has a frame 12 mounting ground engaging wheels 13 and adapted for travel in the direction to the left, as viewed in FIG. 1. A pair of hydraulic lifting arms 14, connected to a suitable hydraulic system not shown, are mounted on the frame extending rearwardly therefrom and pivotally mounting linking arms 15 at the rearwardmost ends thereof. Each linking arm has a pivotal connection 16 at its distal end. A pivotal linkage 17 is secured on the frame. The linkage has a connection 18 at its remote end rearwardly of the pivotal connections 16 of the lifting arms adapted to be secured in fixed, non-pivotal relation on agricultural implements.

Figure 1:
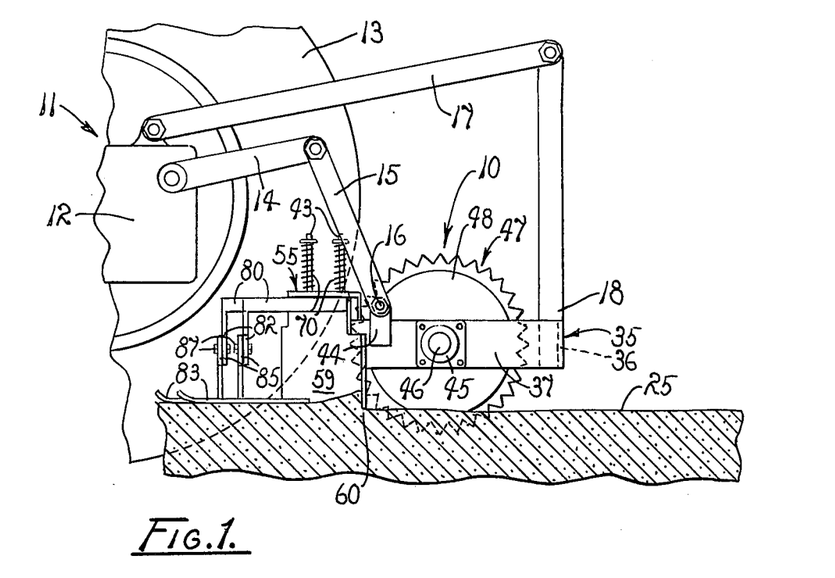
FIG. 1 is a side elevation of a cultivator embodying the principoles of the present invention shown mounted on the rear of a tractor which is fragmentarily represented.

As shown in FIG. 1, the tractor 11 mounting the cultivator 10, as will subsequently be described, is adapted for movement over the earth surface generally indicated at 25. The cultivator is particularly adapted for use with a row crop, such as cotton, indicated by numeral 26 in FIG. 7. As shown therein, the crop is planted in rows bounded on opposite sides by furrows 27.

Figure 2:
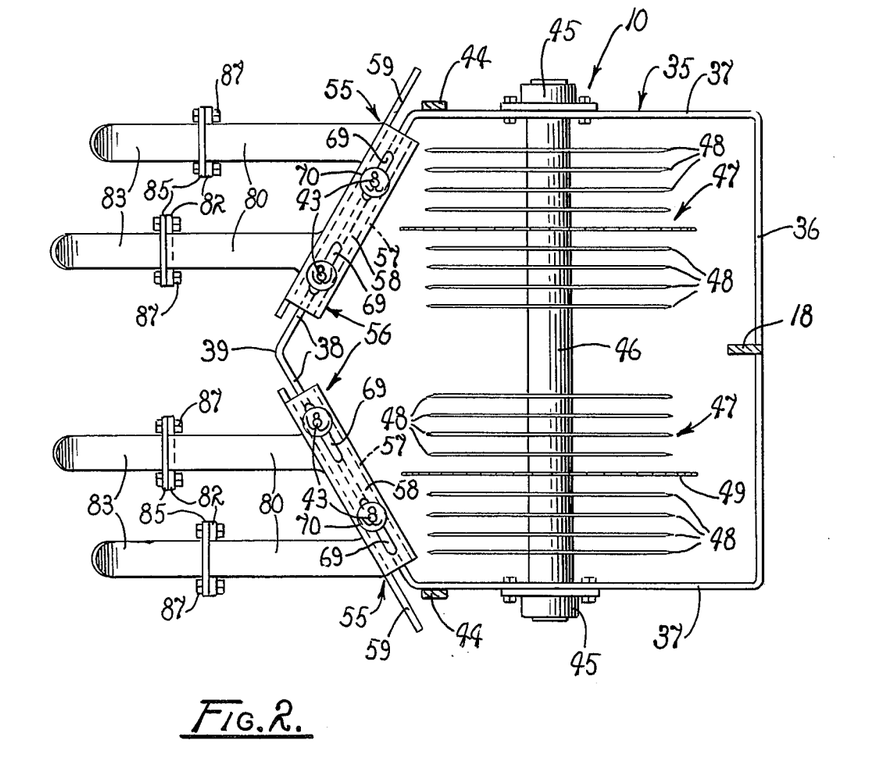
FIG. 2 is a somewhat enlarged top plan view of the cultivator.
Figure 3:
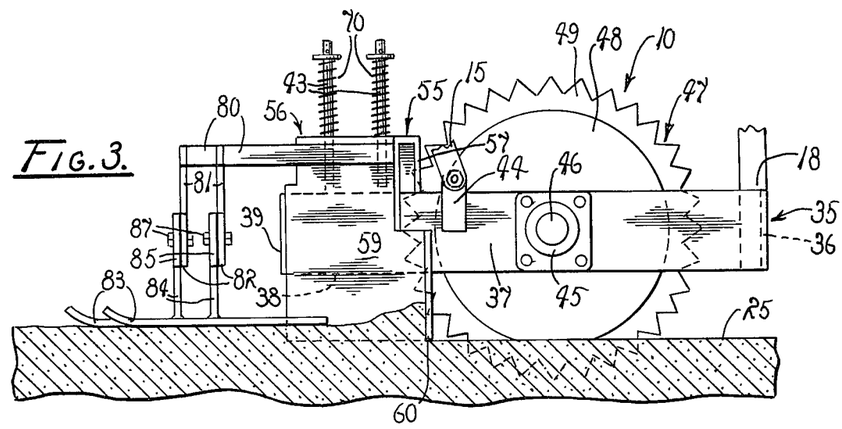
FIG. 3 is a side elevation of the cultivator.

The cultivator 10 has a preferably pentagonally shaped main frame 35, as best shown in FIG. 2. The main frame has a rear member 36 extending substantially transversely to the intended direction of travel of the cultivator. A pair of side members 37 are inegrally mounted on the remote ends of the rear member extending forwardly in substantially parallel relation normal to the rear frame member. A pair of forward frame members 38 are integrally secured on the remote, forwardly extending ends of the side frame members and converge in a substantially V-shaped configuration. The forward frame members integrally interconnect at a forwardmost portion 39 of the main frame.

Figures 4, 5, 6, 7:
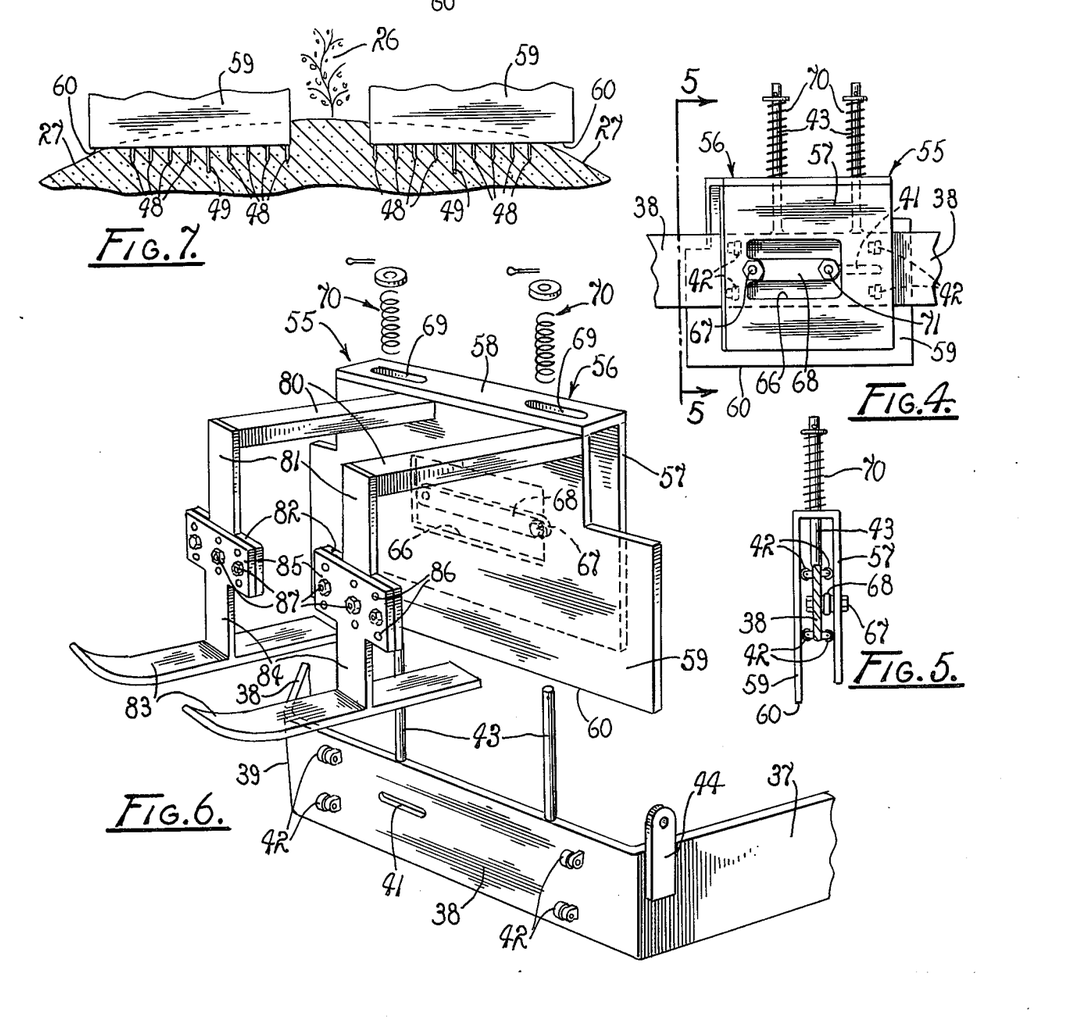
FIG. 4 is a fragmentary rear elevation of a portion of the cultivator.
FIG. 5 is a transverse vertical section taken on line 5-5 in FIG. 4.
FIG. 6 is an exploded view of a portion of the cultivator.
FIG. 7 is a fragmentary front elevation of a ground engaging portion of the cultivator.

Each forward frame member 38 has a longitudinal slot 41 in a position spaced from the forwardmost portion 39 of the main frame 35, as best shown in FIG. 6. Vertically oriented bearing wheels 42 are borne by each forward frame member on the opposite sides thereof, as best shown in FIGS. 5 and 6. A pair of rods 43 are affixed on each of the forward frame members in upstanding parallel relation. A mounting flange 44 is individually fastened on each side member and the rear member, as shown best in FIG. 2.

A pair of bearings 45 are individually mounted on the side frame members 37 of the main frame 35 defining an axis parallel to the rear frame member 36 and normal to the intended direction of travel of the cultivator. A shaft 46 is mounted in the bearings for rotational movement. A pair of disk units 47 are borne by the shaft in axially spaced relation. Each of the units is composed of a plurality of disk blades 48 mounted on the shaft for rotation therewith in axially spaced relation in alignment with the intended direction of travel of the cultivator. Each of the disks is preferably of a substantially flat configuration. Each disk unit has a toothed drive disk 49 affixed on the shaft. The drive disks are preferably of a somewhat greater diameter than the disk blades 48.

A pair of scraper blade assemblies 55 are individually mounted on the forward frame members 38 in floating and horizontally adjustable relation, as will subsequently be described. Each of the blade assemblies has a subframe 56 received about its respective forward frame member. Each subframe consists of a substantially flat back plate 57 having a top plate 58 integrally secured along the upper edge thereof extending forwardly in substantially right angular relation thereto. A scraper blade 59 is affixed on the top plate and extends downwardly therefrom in spaced substantially parallel relation to the back plate. The scraper blade has a scraper edge 60 remote from, and parallel to, the top plate.

Each of the back plates 57 has an opening 66 and a pivotal connection 67 immediately adjacent to the opening. An arm 68 is mounted on the pivotal connection of each back plate extending longitudinally of the opening, as best shown in FIG. 4. A pair of axially aligned longitudinal openings or slots 69 are provided in the top plate 58 of each blade assembly 55 in spaced positions. Each blade assembly is received about its respective forward frame member 38 with the rods 43 thereof individually extending through the longitudinal slots 69 of the top plate.

A pair of compression spring assemblies 70 are individually secured on the remote, upwardly extending ends of the rods 43 of each forward frame member 38 engaging the top plate 58 so as to urge their respective scraper blade 59 downwardly about the forward frame member. The remote end of the arm 68 is connected to the forward frame member by a pivotal connection 71 adjustably received in the slot 41. When mounted as described, the back plate 57 and scraper blade 59 of each blade assembly 55 contact the bearing wheels 42 of its respective forward frame member so as to guide vertical movement of each assembly. As shown in FIG. 2, each of the scraper blade assemblies is mounted obliquely to the intended direction of travel of the cultivator 10. The scraper blades are thus adapted for individual vertical floating movement. As will subsequently be more fully described, the scraper blades are also horizontally adjustable to and from the forwardmost portion 39 of the main frame 35. Thus, the scraper blade assemblies can be adjusted so that the adjacent ends of the scraper blades engage each other in juxtaposition to the forwardmost portion.

A pair of mounting arms 80 are affixed on each of the scraper blades 59 and extend forwardly therefrom in spaced relation and in alignment with the intended direction of travel of the cultivator. An extension 81 is borne by each of the mounting arms at the forward end thereof and extend downwardly substantially normally to the arm. Each extension mounts an adjustment plate 82 at its lowermost end. A surface gauge means or ski 83 is individually secured on each adjustment plate. Each ski has an extension upwardly therefrom and mounting an adjustment plate 85 at the upper end thereof. The adjustment plates 82 and 85 of each mounting arm have a plurality of corresponding bores 86 extending therethrough. The adjustment plates are adjustably maintained in facing engagement by bolt assemblies 87 extending through selected bores so as to position their respective skis in the desired vertical and horizontal position relative to the scraper edge 60 of the scraper blade 59.

OPERATION OF THE FIRST EMBODIMENT

The operation of the first embodiment of the present invention is believed to be clearly apparent and is briefly summarized at this point. The cultivator 10 is mounted on the tractor 11 by coupling the pivotal connections 16 of the linking arms 15 to the mounting flanges 44 of the side frame members 38. Similarly, the connection 18 of the pivotal linkage 17 is fixedly secured on the mounting flange of the rear frame member 36, as best shown in FIG. 1. As previously noted, the scraper blade assemblies 55 can be horizontally adjusted on their respective forward frame members 38 by first loosening the adjustable pivotal connections 71 of the arms 68. The assemblies can then be moved horizontally as permitted by the slot 41 and the slots 69. Thereafer the adjustable pivotal connections are again tightened. Thus, precise positioning of the assemblies for the particular operation to be performed is permitted.

Similarly, the adjustment plates 82 and 85 of each scraper blade assembly are adjustable relative to each other by repositioning of the bolt assemblies 87 in selected bores 86. This permits positioning of the ground engaging skis 83 in the desired vertical and horizontal positions relative to the scraper edge 60 of the scraper blade 59. In one arrangement, the assemblies are adjusted so as to position the innermost edges of the scraper blades in positions for scraping immediately adjacent to and on opposite sides of the row crop 26 with which the cultivator is to be employed. The skis are usually adjusted to define a limited depth of penetration for the scraper blades. This configuration is particularly suited for weeding immediately adjacent to the row crop, for conditioning the soil for the application of additives, and for removing soil crust.

Subsequent to such adjustment, the tractor 11 is operated to position the cultivator 10 in longitudinal alignment with the row crop 26. Utilizing the hydraulic lifting arms 14, the cultivator is lowered to rest the skis 83 on the earth surface 25 with the scraper edge 60 penetrating the surface. The hydraulic system of the tractor is then released so that the cultivator is free floating on the skis. As shown in FIG. 1, the toothed drive disks 49 also penetrate the ground surface when the cultivator is positioned as described. The cultivator is then drawn along the earth surface by the tractor with the scraper blade assemblies 55 as well as the disk units 47 disposed on opposite sides of the row crop. During earth traversing movement, the skis react to variations in the surface so as correspondingly to lift the scraper edge 60. The compression spring assemblies 70 resiliently urge the scraper blade 59 downwardly with respect to the main frame 35 thereby insuring that the skis are maintained in constant engagement with the earth surface and the scraper edge is maintained at the pre-selected depth regardless of elevational variations in the earth surface.

Such scraping by the cultivator 10 causes the ridges between the furrows 27 to be leveled adjacent to the row crop 26 to form substantially horizontal paths or swaths on opposite sides of the row crop, as best shown in FIG. 7. Simultaneously with the formation of the swaths, any undesirable features of the earth surfaces 25, such as the surface crust, are removed. Similarly, debris adjacent to the row crop is removed. The swaths are thus substantially horizontal and of considerably improved permeability.

The disk unit 47 trailing each scraper blade assembly 55 travels along the swath formed by its respective scraper blade assembly so as longitudinally to slice the swath. Permeability within the swaths is thus further enhanced without turning the soil over in a manner disruptive to the row crop 26. The toothed drive disk 49 of each disk unit, having a greater diameter than that of the disk blades 48, rotates the disk blades at a slower rate of speed than that which would be achieved if the speed were controlled only by the ground contact of the disk blades themselves. This produces a controlled slicing action which further protects against the disruptive influence of the disk units so as to minimize the disturbance of the row crop.

The swaths thus formed by the cultivator 10 are of improved permeability. Accordingly, the subsequent application of additives such as fertilizers, herbicides, fungicides, and the like to the earth surface 25 within the swaths is accorded its maximum effect since the additives easily permeate the surface at the point of application. Removal of the crust and leveling of the earth surface within the swaths precludes or minimizes run off of liquid additives. Irrigation of the row crop is also enhanced by such preconditioning of the earth surface. Obviously, as the cultivator forms the swaths, it removes unwanted vegetation immediately adjacent to the row crop without adversely disturbing the crop.

In an alternative arrangement, the cultivator 10 can be employed to condition the earth surface 25 for the optimum growth of seedlings from newly planted seeds. As previously noted, climatic conditions frequently produce a surface crust which impedes or precludes the germination and emergence of seeds. This alternative configuration of the cultivator permits removal of the crust without damage to the seeds themselves. Where used for this purpose, the scraper blade assemblies 55 are horizontally adjusted, as previously described, to position adjacent ends of the scraper blades 59 in abutment with each other. Similarly, the assemblies are adjusted to define a minimum depth of penetration for the scraper edge 60. Subsequently, the cultivator is drawn by the tractor 11 along the seed bed preferably with the point of abutment of the scraper blades in vertical alignment with the seed bed. Since the blades only penetrate the earth surface to a limited extent, the crust is shaved from the bed without disturbing the seeds. The disk blades 48 slice the soil on the immediate opposite sides of the seed bed to make the soil more receptive to subsequent irrigation or the application of additives to the soil. Because the scraper blades and disk blades penetrate the earth surface to a precisely controlled extent, the cultivator causes a minimum of disturbance to the soil. Thus, the seeds remain covered by the loosened soil and are allowed to germinate and develop normally.

An additional application of the cultivator 10, in either of the above-described adjusted arrangements, is to draw one of the scraper blades 59 directly over the seed row so that the disk unit 47 mounted therebehind will shave the crust off of the seed bed in the swath found by the blade. This insures that even the most impermeable crust is broken and removed. Since the disk blades 48 do not turn the soil, the seeds remain covered with loosened soil. Furthermore, the controlled slicing action does not damage the seeds themselves. It is obvious that the cultivator is adapted to be employed for other earth working operations in addition to those described.

DESCRIPTION OF THE SECOND EMBODIMENT OF THE PRESENT INVENTION

Referring to FIGS. 8 through 11, it will be seen that the second form of the present invention provides a pentagonal main frame 135 similar to frame 35 and having a pair of forwardly converging frame members 138 joined at a forwardmost portion 139.

For convenience in mounting the main frame 135 on the tractor 11, the rearward portion of the frame provides a connector 140, similar to the connector 18 in the first form of the invention and opposite sides of the frame provide mounting flanges 141, similar to the mounting flanges 44 of the first form of the invention. The connection to the tractor is accomplished in the manner previously described.

The frame mounts a pair of disk units 147, similar to the disk units 47, which are not again described.

Figure 8:
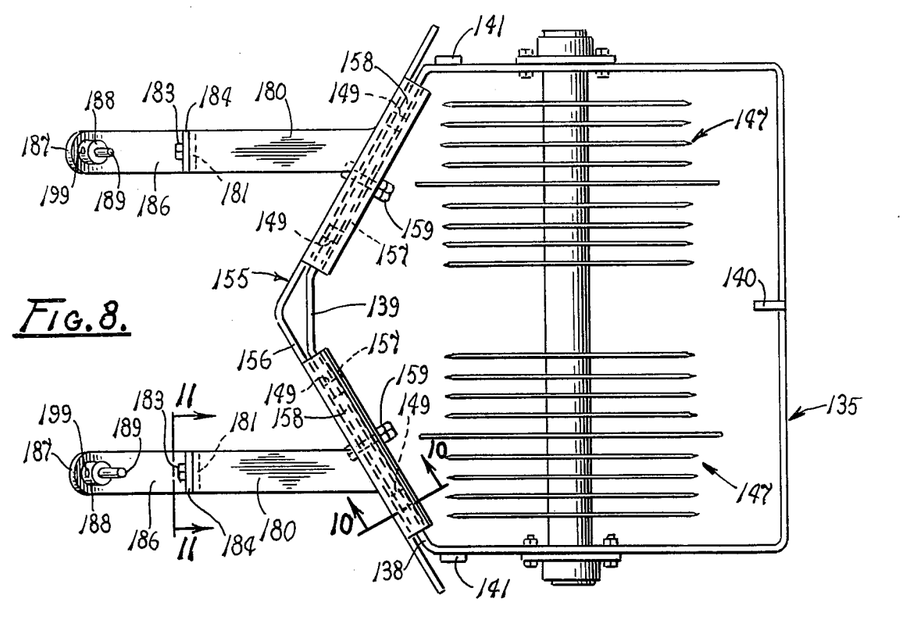
FIG. 8 is a plan view of a second form of the cultivator of the present invention.
Figure 9:
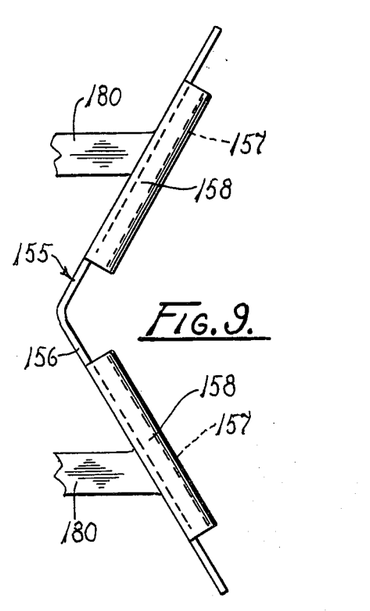
FIG. 9 is a fragmentary plan view of a blade assembly of the cultivator of FIG. 8 removed from its mounting structure for illustrative clarity.
Figure 10:
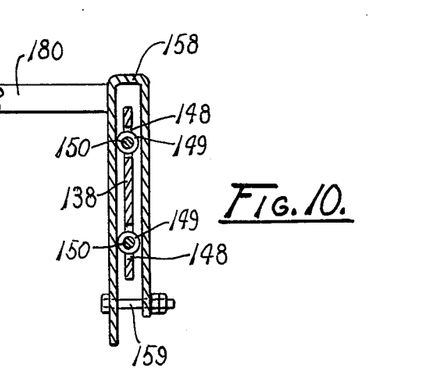
FIG. 10 is a vertical section taken on line 10-10 of FIG. 8.
Figure 11:
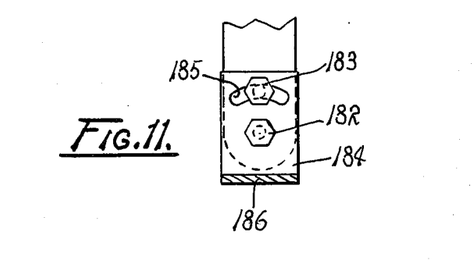
FIG. 11 is a fragmentary section taken on line 11-11 of FIG. 8.

Each of the frame members 138 consists of a flat plate disposed in an erect plane oblique to the direction of travel of the frame. As best shown in FIGS. 8 and 10, each frame member provides two elevationally spaced pairs of openings 148 each of which mounts a roller bearing 149 for rotation about a horizontal axle 150. Each axle is disposed in the plane of its respective frame member 138 with its respective bearing projecting from opposite sides of the frame member.

A scraper blade assembly 155 is mounted on the frame members 138 for rectilinear elevational movement. The assembly provides a V-shaped scraper blade 156 having opposite sides disposed in erect parallel planes oblique to the direction of travel and parallel to a respective frame member 138. A back plate 157 is provided rearwardly adjacent to each frame member 138 and connected to the upper edge of the blade by a top plate 158 integral with each. As best shown in FIG. 10, each back plate 157 with its top plate 158 and the blade 156 forms a U-shaped bracket fitted downwardly over its respective frame member 138 in rollable engagement with the bearings 149. The back plates and blade are preferably spaced as closely adjacent to each other as they can be and yet allow free bearing rotation.

A nut and bolt assembly 159 interconnects each back plate 157 and the scraper blade 156 beneath the frame members 138. The nut and bolt assemblies secure the scraper blade assembly 155 on the frame members 138 and by tightening can resiliently spring the back plates 157 toward the scraper blade 156 to adjust their spacing.

An arm 180 is rigidly mounted on the upper edge of the scraper blade 156 on each side of the blade assembly 155 and forwardly horizontally extended therefrom. A vertical arm or post 181 is downwardly extended from the forward arm 180 and provides a pivot nut and bolt assembly 182 and locking nut and bolt assembly 183 in the lower end thereof. An auxiliary arm 184 is pivoted on each pivot nut and bolt assembly 182 and provides an arcuate slot 185 concentrically thereto through which the locking nut and bolt assembly is extended releasably to lock the auxiliary arm in adjusted pivotal position. Each auxiliary arm mounts a ski 186 on the lower end thereof for flat earth engagement. Each ski has an upwardly curved forward end portion 187. A bore, not shown, is provided downwardly in each of the forward end portions. A sleeve 188 is secured on each ski in registry with the bore and a finger 189 mounted therein for endward adjustment. A setscrew 199 is provided in each sleeve and is engageable with the finger therein to adjust its longitudinal positioning in the ski.

OPERATION OF THE SECOND EMBODIMENT

The operation of the second embodiment is substantially similar to that of the first embodiment and is briefly reviewed at this point. The main frame is mounted on the tractor 11 in the manner described for the first form and motivated along a row crop, to the left as viewed in FIGS. 8 and 9. Preliminary to operation, the locking nut and bolt assemblies 183 are released and the skis 186 transversely tipped or leveled flatly to engage the sides or bottoms of adjacent furrows, not shown, and the locking nut and bolt assemblies then tightened to secure the skis in flat earth engagement. The setscrews 199 are released and the fingers 189 slid downwardly until they protrude from the lower portion of the skis in which position they are locked by tightening the setscrews 199.

As the cultivator proceeds along the row of crops, the fingers 189 deflect any clods, stones or other debris which might otherwise tend to impair the operation of its ski in accurately detecting the ground surface. As in the first form of the invention, the relationship of the skis 186 to the bottom of the scraper blade 156 is such that as the blade is caused to traverse a crop row, it shaves a thin layer of soil from the row of crops to remove the crust and avoid the difficulties otherwise caused thereby. Since the scraper blade is V-shaped and fitted against the bearings 149, it is self-centering and requires no other expedient for the purpose. As the skis traverse an elevation, they correspondingly lift the scraper blade 156 and conversely when they traverse a depression they correspondingly lower the scraper blade. Thus, at all times, the skis accurately and precisely control the depth of earth engagement of the scraper blade 156.

DESCRIPTION OF THE THIRD EMBODIMENT OF THE PRESENT INVENTION

Figure 12:
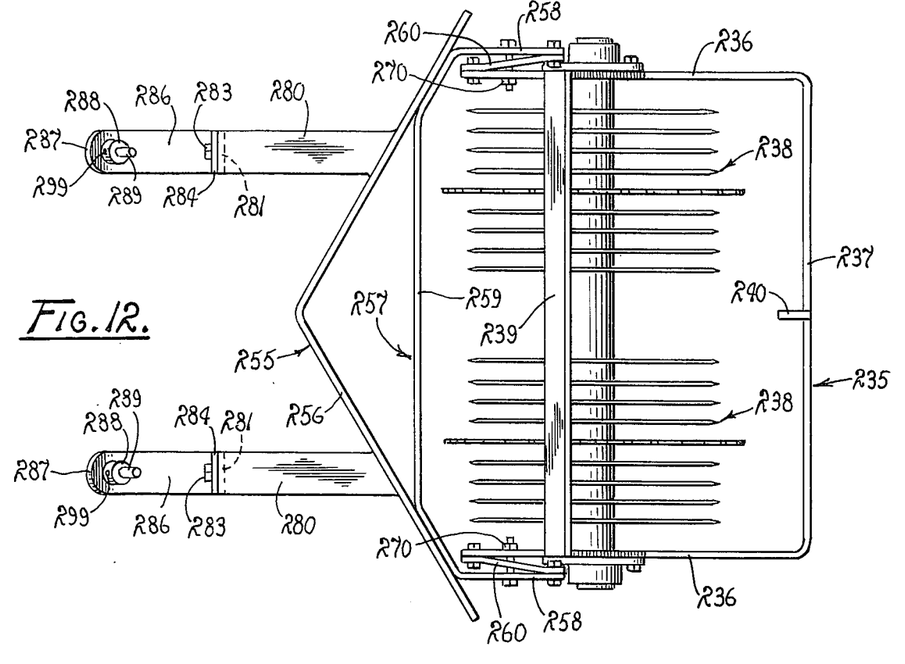
FIG. 12 is a plan view of a third form of the cultivator of the present invention.
Figure 13:
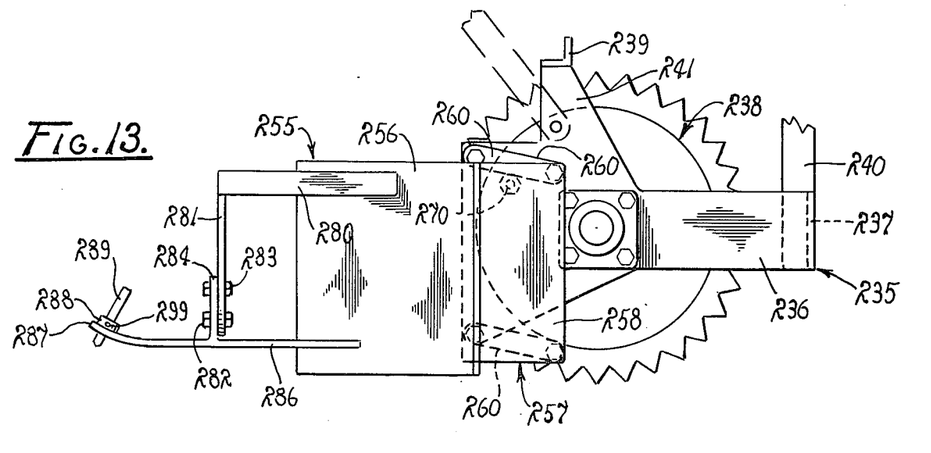
FIG. 13 is a side elevation of the cultivator of FIG. 12.

The third form of the present invention is shown in FIGS. 12 and 13 and employs a main frame 235 having opposite sides 236 and a back 237. A pair of disk units 238, similar to the units 47 and 147, are mounted between the sides 236. The sides are forwardly extended from the disk units and upwardly extended so that a brace 239 can interconnect the sides without interfering with the disk units.

As before, the main frame 235 provides an erect connector 240 at the rear thereof and mounting flanges 241 to which the linking arms 15 of the tractor are pivotally connected.

A scraper blade assembly 255, having a V-shaped scraper blade 256 is employed. An auxiliary frame 257 having rearwardly extended opposite sides 258 and a brace 259 interconnects opposite sides of the blade. The auxiliary frame and thus the blade assembly 255 are mounted on the main frame 235 by a pair of links 260, best shown in FIG. 13. Each link is pivotally mounted on the forward end of a side 236, rearwardly extended therefrom, and pivotally connected to the rearwardly extended end of the sides 258. The links at each side of the unit are disposed in elevationally spaced parallel relation and thus mount the blade 256 for free floating elevational movement while maintaining a constant upright attitude.

Stops 270 are provided on each side member 236 in positions to limit downward pivotal movement of the rearward ends of the uppermost arms 260 connected thereto. Thus, the tractor in raising the frame 235 raises the entire cultivator for transport purposes. Of course, the stops are spaced downwardly from their respective arms a distance sufficient to accommodate a full range of elevational movement of the scraper blade 256 during operation.

Like the arms 180 in the second form of the invention, rigid arms 280 are mounted on the upper edge of the scraper blade 256 and forwardly extended therefrom on opposite sides of the blade. The forward ends of the arms have vertical arms 281 downwardly extended therefrom and providing pivot nut and bolt assemblies 282 and locking nut and bolt assemblies 283. As in the second form of the invention, an auxiliary arm 284 is pivotally connected to the vertical arm by means of the nut and bolt assemblies in the manner previously discussed and not here reviewed. Each auxiliary arm mounts a ski 286 providing a forward end 287 mounting a sleeve 288 through which a finger 289 is extended and locked in position by means of a setscrew 299.

OPERATION OF THE THIRD EMBODIMENT

In the third form of the present invention the main frame is connected to the tractor 11 in the usual way and can be elevated for transport in the usual manner. When the main frame 235 is elevated, the parallel links 260 pivot downwardly until such movement is limited by the stops 270 at which point the stops serve to elevate the auxiliary frame 257 and the entire structure borne thereby.

When the cultivator of the third form of the present invention is caused to pass longitudinally along a row of cotton or the like, the skis 286 slide along the ground with the fingers 289 deflecting the rocks and other obstructions so that the skis provide accurate detection of ground level. The scraper blade 256 is carried on the skis in fixed elevational relation thereto and scrape a layer of top soil from the row so as to eliminte the soil crust and avoid the difficulties incident thereto.

While three preferred forms of mounting the scraper blades 56, 156, and 256 on the main frames 35, 135, and 235 have been shown, certain common features are worthy of note. It has been found that if the scraper blades are to be controlled with precision as to their elevation, they should maintain a constant attitude with respect to the soil engaged. Thus, the blades should maintain a constant vertical attitude as they are elevationally adjusted by the skis 86, 186, or 286. In the first two forms of the invention, such elevational movement is rectilinear. In the third form the blade moves in parallelism as the parallel links pivot upwardly and downwardly. Thus, the three forms of the present invention have in common a precision of elevational control not heretofore attainable in cultivators for the purpose.

The cultivators of the present invention are adjustable to provide a hertofore unattainable degree of control permitting the conditioning of the earth surface on or immediately adjacent to row crops so as to make the soil receptive to the application of additives, the removing of surface crust above seed beds and adjacent to row crops to create an optimum earth environment, and the performing of conventional earth working opertions while minimizing the possibility of adverse disturbance to the seeds or row crop.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A cultivator for scraping to a substantially constant predetermined depth below the earth surface by reacting to elevational variations of the surface, comprising a frame adapted for earth traversing movement in a predetermined direction of travel and having a pair of forwardly convergent frame members; a pair of earth engaging scraper blades having scraper edges; means mounting the scraper blades on the frame members for elevational movement oblique to the intended direction of travel, said blades being horizontally adjustable on their respective frame members to and from engagement with each other, said blade mounting means including a rod fastened on each frame member in upstanding relation and wherein each blade mounts a top plate having a slot defining an axis substantially parallel to its respective blade through which its respective rod extends for horizontal adjustment of the blade relative to the frame member; earth gauge means, having an earth contact surface, secured on each blade with the contact surface disposed in a predetermined elevational position relative to the edge; and resilient means for urging the blade and gauge means into earth engagement including a spring assembly secured on each rod in engagement with its respective top plate.

2. The cultivator of claim 1 in which the frame mounts a plurality of disk blades in trailing relation to each of the scraper blades, each of said blades being substantially flat and mounted in alignment with the intended direction of travel.

3. The cultivator of claim 2 in which the gauge means includes an arm mounted on each scraper blade extending forwardly therefrom in alignment with the intended direction of travel and an earth engaging ski is adjustably mounted on each arm.

4. A cultivator for row crops comprising a frame for earth traversing movement along rows of crops, a substantially flat scraper blade, means mounted on the frame and mounting the blade on the frame for earth traversing movement with the frame and elevational movement with respect to the frame with the blade disposed in a substantially erect plane extended transversely of the direction of said earth traversing movement, elongated skid means in the form of a ski having an upturned forward end, means interconnecting the blade and the skid means supporting the blade on the skid means for corresponding elevational movement with the skid means substantially aligned with the direction of earth traversing movement of the frame and disposed in earth engagement forwardly of the blade, and a rod-like finger mounted on the upturned forward end of the skid means and downwardly extended for earth engagement forwardly of the skid means to deflect rocks, clods and other obstructions from the path of the skid means.

* * * * *

UNITED STATES PATENT AND TRADEMARK OFFICE
CERTIFICATE OF CORRECTION

PATENT NO. : 3,963,079
DATED : June 15, 1976
INVENTOR(S) : James J. Carlucci

It is certified that error appears in the above-identified patent and that said Letters Patent are hereby corrected as shown below:

Column 3, line 48, delete "endrearwardly" and insert ---end rearwardly---.

Column 5, line 17, after "extension" insert ---84 extending---.

Signed and Sealed this

Thirty-first Day of August 1976

[SEAL]

Attest:

RUTH C. MASON
Attesting Officer

C. MARSHALL DANN
Commissioner of Patents and Trademarks